(12) United States Patent
Takasao

(10) Patent No.: US 12,669,591 B2
(45) Date of Patent: Jun. 30, 2026

(54) OPTICAL DISTANCE MEASURING DEVICE

(71) Applicant: DENSO CORPORATION, Kariya-city (JP)

(72) Inventor: Daisuke Takasao, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 930 days.

(21) Appl. No.: 18/046,772

(22) Filed: Oct. 14, 2022

(65) Prior Publication Data

US 2023/0065210 A1     Mar. 2, 2023

Related U.S. Application Data

(63) Continuation of application No. PCT/JP2021/014142, filed on Apr. 1, 2021.

(30) Foreign Application Priority Data

Apr. 15, 2020     (JP) ................................. 2020-072685

(51) Int. Cl.
    *G01S 7/487* (2006.01)
    *G01S 7/48* (2006.01)
    (Continued)

(52) U.S. Cl.
    CPC .......... *G01S 7/4876* (2013.01); *G01S 7/4808* (2013.01); *G01S 7/4865* (2013.01); *G01S 17/10* (2013.01); *G01S 17/50* (2013.01)

(58) Field of Classification Search
    CPC .... G01S 17/931; G01S 13/931; G01S 7/4802; G01S 2013/93271; G01S 7/354;
    (Continued)

(56) References Cited

U.S. PATENT DOCUMENTS

| 5,923,282 A | 7/1999 | Honma et al. |
| 9,537,956 B1 | 1/2017 | Sibenac et al. |
| | (Continued) | |

FOREIGN PATENT DOCUMENTS

| JP | 2006-030094 A | 2/2006 |
| JP | 2007304069 A | * 11/2007 |
| | (Continued) | |

OTHER PUBLICATIONS

JP-2007304069-A (Year: 2007).*

*Primary Examiner* — Sanjiv D. Patel
(74) *Attorney, Agent, or Firm* — Precision Patents, P.C.

(57) ABSTRACT

An optical distance measuring device includes a light-emitting unit emitting light, a light-receiving unit having a light-receiving pixel for receiving incident light and outputting a detection-signal corresponding to received-light intensity of the incident light, and a controller acquiring a detection-signal corresponding to received-light intensity of reflected light, which corresponds to the emitted light reflected by an object, from the light-receiving unit that has received the reflected light as the incident light, to detect a distance to the object by using the detection-signal corresponding to the received-light intensity. When a first object and a second object at distance which is N times a distance to the first object on an extension of a straight line connecting the measuring device and the first object are detected, and the second object is determined to be a pseudo object corresponding to the first object, the controller removes a detection result of the second object.

4 Claims, 8 Drawing Sheets

(51) Int. Cl.
    *G01S 7/4865*       (2020.01)
    *G01S 17/10*       (2020.01)
    *G01S 17/50*       (2006.01)

(58) Field of Classification Search
    CPC ........ G01S 7/4876; G01S 7/493; G01S 7/414;
                  G01S 13/865; G01S 7/4865; G01S
                7/4816; G01S 7/4817; G01S 7/4811;
           G01S 17/04; G01S 7/4808; G01S 17/42;
          G01S 17/10; G01S 7/0236; G01S 7/0235;
            G01S 7/023; G01S 17/08; G01S 7/415
    See application file for complete search history.

(56)                 References Cited

U.S. PATENT DOCUMENTS

| | | | |
|---|---|---|---|
| 2009/0121915 A1* | 5/2009 | Randler ................ | G01S 13/584 |
| | | | 342/70 |
| 2016/0116591 A1* | 4/2016 | Fukuman ................ | G01S 15/46 |
| | | | 367/124 |
| 2019/0178996 A1 | 6/2019 | Nomura | |
| 2022/0163649 A1* | 5/2022 | Li ........................... | G01S 7/354 |

FOREIGN PATENT DOCUMENTS

| | | |
|---|---|---|
| JP | 2014-098635 A | 5/2014 |
| JP | 2019-144210 A | 8/2019 |
| JP | 2020-020612 A | 2/2020 |

* cited by examiner

FIG.7

OPTICAL DISTANCE MEASURING DEVICE

CROSS-REFERENCE TO RELATED APPLICATION

The present application is based on and claims the benefit of priority from earlier Japanese Patent Application No. 2020-072685 filed Apr. 15, 2020, the description of which is incorporated herein by reference.

BACKGROUND

Technical Field

The present disclosure relates to an optical distance measuring device.

Related Art

A target detection system is known which emits laser light to a predetermined search region and receives light reflected from a target by a plurality of light receiving elements to detect the target.

SUMMARY

As an aspect of the present disclosure, an optical distance measuring device is provided which includes: a light emitting unit that emits emitted light; a window through which the emitted light is transmitted; a light receiving unit that has a light receiving pixel for receiving incident light and outputs a detection signal corresponding to received light intensity of the incident light received by the light receiving pixel; and a controller that acquires a detection signal corresponding to received light intensity of reflected light, which corresponds to the emitted light reflected by an object, from the light receiving unit that has received the reflected light as the incident light, to detect a distance to the object by using the detection signal corresponding to the received light intensity of reflected light. When a first object and a second object located at a distance which is N times (N is a natural number of 2 or more) a distance to the first object on an extension of a straight line connecting the optical distance measuring device and the first object are detected, and the second object is determined to be a pseudo object corresponding to the first object, the controller removes a result of the detection of the second object. If it is determined that the acquired detection signal is a detection signal corresponding to reflected light reflected by the window, the controller removes a result of detection corresponding to the window.

BRIEF DESCRIPTION OF THE DRAWINGS

In the accompanying drawings:

FIG. 7 is an explanatory diagram illustrating a condition for determining that the second object is a pseudo object by an optical distance measuring device according to a second embodiment;

DETAILED DESCRIPTION OF THE PREFERRED EMBODIMENTS

A target detection system is known which emits laser light to a predetermined search region and receives light reflected from a target by a plurality of light receiving elements to detect the target. (e.g., JP 2014-098635 A)

If the intensity of the light reflected from the target increases, the light reflected from the target is further reflected by surfaces of the light receiving elements toward the target. Hence, the above target detection system may not accurately detect the target.

The present disclosure solves at least part of the above problem and can be implemented as the following embodiments or examples of application.

A. First Embodiment

Figure 1:
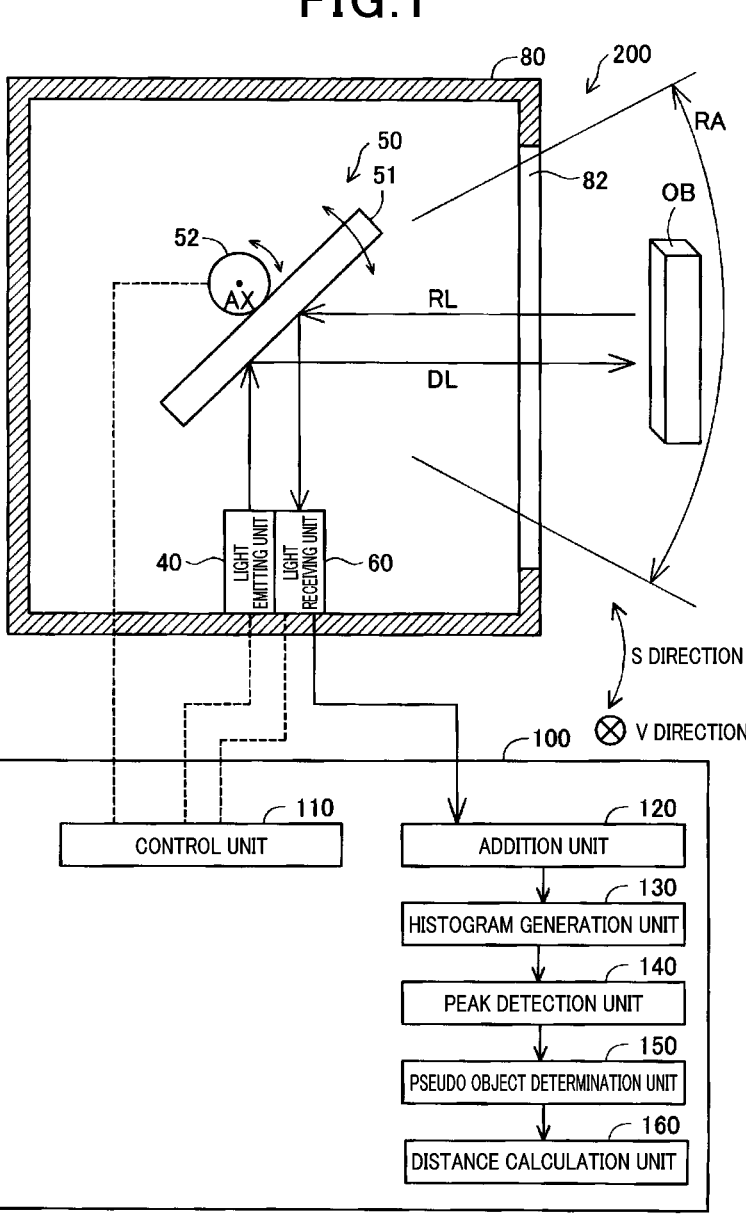
FIG. 1 is an explanatory diagram illustrating a configuration of an optical distance measuring device according to a first embodiment.

As illustrated in FIG. 1, an optical distance measuring device 200 according to a first embodiment of the present disclosure is installed in and use for a movable object, for example, a vehicle. The optical distance measuring device 200 detects, for example, a distance, a relative velocity, and an angle with respect to an object such as another vehicle, a pedestrian, and a building present in a set distance measurement region. Results of detection by the optical distance measuring device 200 are used for, for example, controlling drive of the vehicle. The optical distance measuring device 200 includes a controller 100, and a light emitting unit 40, a scanning unit 50, and a light receiving unit 60, which are included inside a housing 80. A wall surface of the housing 80 is provided with a window 82 through which laser light is transmitted.

The light emitting unit 40 includes a laser diode as a light source for optical distance measurement and emits laser light DL as emitted light for optical distance measurement. The light source of the light emitting unit 40 may be not only a laser diode but instead another light source such as a solid-state laser.

The scanning unit 50 functions as a so-called one-dimensional scanner. The scanning unit 50 includes a mirror 51 and a rotor 52. The mirror 51 is fixed to the rotor 52. The rotor 52 receives a control signal from the controller 100 to rotate in a forward direction or a backward direction around a central axis AX, which is a rotation axis. The laser light DL emitted from the light emitting unit 40 is reflected by the mirror 51 and is transmitted through the window 82 to be externally radiated from the housing 80.

A predetermined region along an S direction illustrated in FIG. 1 is scanned with the laser light DL by the mirror 51 moving accompanying rotation of the rotor 52. The region which the optical distance measuring device 200 scans with the laser light DL to perform distance measurement is hereinafter also referred to as a scanning region RA. The S direction is a scanning direction of the laser light DL and is parallel to a horizontal plane in the present embodiment. A V direction illustrated in FIG. 1 is an arrangement direction of pixels 66 described later. The V direction is perpendicular to the S direction and is parallel to a vertical direction in the present embodiment.

The light receiving unit 60 receives incident light and outputs a detection signal corresponding to received light intensity of the received incident light. The incident light may include reflected light RL corresponding to the laser light DL reflected by a target in the scanning region RA, for example, an object OB illustrated in FIG. 1 and interference light, for example, sunlight, light of a street lamp, and light from lights of another vehicle.

The controller 100 is a microcomputer including a well-known microprocessor and memory. Executing a program previously stored in the memory by the microprocessor implements functions of a control unit 110, an addition unit 120, a histogram generation unit 130, a peak detection unit 140, a pseudo object determination unit 150, and a distance calculation unit 160.

The control unit 110 controls drive of the light emitting unit 40, the scanning unit 50, and the light receiving unit 60. More specifically, the control unit 110 outputs a command signal for causing the laser diode to emit light to the light emitting unit 40, outputs an address signal for causing the light receiving elements to be active to the light receiving unit 60, and outputs a control signal for the rotor 52 to the scanning unit 50.

The addition unit 120 is a circuit that sums signal intensity of the light receiving elements of the light receiving unit 60. The histogram generation unit 130 sums multiple results of summing by the addition unit 120 to generate a histogram of signal intensity with respect to a time axis. The peak detection unit 140 analyzes the histogram input from the histogram generation unit 130 to detect a position of the peak signal of a signal corresponding to the reflected light RL relative to time. The peak signal in the histogram indicates intensity of a reflected light pulse and indicates that an object may be present at a location (distance) according to TOF (time of flight) corresponding to the peak signal. The information on the position of the detected peak signal is output to the pseudo object determination unit 150.

The pseudo object determination unit 150 uses the peak signal detected by the peak detection unit 140 to determine whether the detected object is a pseudo object. The pseudo object means an object, which is not actually present, detected by the light receiving unit 60 due to light emitted from the optical distance measuring device 200 and doubly reflected by an object and the light receiving elements. The pseudo object is also referred to as a ghost. When the vehicle in which the optical distance measuring device is installed detects a pseudo object as an actually present target, control for avoiding a collision with the pseudo object such as brake control can be performed.

If the laser light DL emitted from the light emitting unit 40 strikes, for example, an object having a high reflectance such as a high-reflectance material, the reflected light RL having high intensity is obtained. When the reflected light RL having high intensity enters the light receiving elements 68, part of the reflected light RL is detected by the light receiving elements 68 as a peak signal at a location corresponding to a distance to the object. The reflected light RL that has not been received by the light receiving elements 68 may, for example, not enter the light receiving elements 68 and be reflected by surfaces of the light receiving elements 68 to travel toward the object again. The reflected light reflected by the surfaces of the light receiving elements 68 and traveling toward the object again is hereinafter referred to as second reflected light. When the second reflected light is reflected by the object and enters the light receiving elements 68, the second reflected light is detected as a peak signal corresponding to a pseudo object different from the peak signal of the reflected light RL. When the second reflected light does not enter the light receiving elements 68 and is further reflected by the light receiving elements 68, the second reflected light is further detected as a peak signal different from the second reflected light, and thereafter this process may be repeated similarly. Since the laser light is doubly reflected by the object and the light receiving elements, the laser light travels back and forth between the optical distance measuring device 200 and the object N times (N is a natural number of 2 or more), N being the number of times the laser light is reflected by the object. Hence, the pseudo object can be detected as a peak signal at a location distanced by N times the distance from the optical distance measuring device 200 to the object.

The distance calculation unit 160 uses TOF to measure a distance to a target present in the scanning region RA, for example, the object OB. More specifically, the distance calculation unit 160 calculates a distance to the object OB from the time period between the time at which the laser light DL is emitted from the light emitting unit 40 to the time at which the peak signal of the reflected light RL is received, that is, travel time of the laser light DL. The optical distance measuring device 200 of the present embodiment performs a pseudo object removing process described later. If a pseudo object is detected by the pseudo object determination unit 150, the distance calculation unit 160 removes a result of detection concerning the pseudo object to determine a distance. If no pseudo object is detected, the distance calculation unit 160 uses the obtained peak signal to determine a distance.

Figure 2:
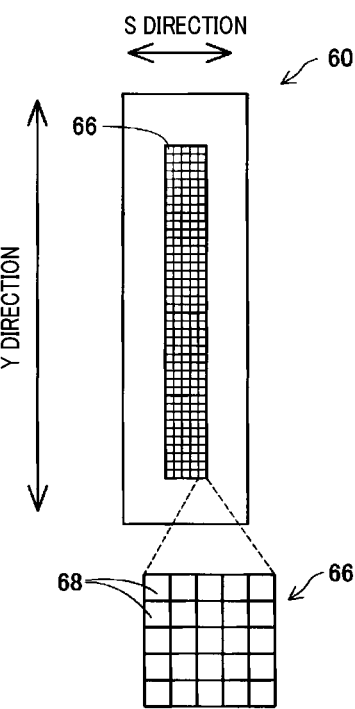
FIG. 2 is an explanatory diagram illustrating a configuration of a light receiving unit.

With reference to FIG. 2, the configuration of the light receiving unit 60 will be described. The light receiving unit 60 has a light receiving surface including a plurality of pixels 66. The pixels 66 are arranged in a two-dimensional plane corresponding to the S direction and the V direction so as to be an elongated rectangle shape along the V direction. The arrangement of the light receiving unit 60 illustrated in FIG. 2 corresponds to light receiving pixels per one slot in the scanning region RA of the laser light DL.

Each of the pixels 66 includes the light receiving elements 68. In the present embodiment, in the pixel 66, five of the light receiving elements 68 are arranged in the S direction, and five of the light receiving elements 68 are arranged in the V direction. In the present embodiment, a single photon avalanche diode (SPAD) is used as the receiving element 68. When receiving light (photon), each of the SPADs can output a pulsed signal indicating entry of the light. The addition unit 120 counts the number of signals output from the plurality of light receiving elements 68 of each of the pixels 66 to determine additional values of the respective pixels 66. The pixel 66 may be formed of one receiving element 68 or may include two or more of light receiving elements 68. The light receiving elements 68 may be arranged in any shape. As the light receiving element 68, a PIN photodiode may be used instead of the SPAD.

Figure 3:
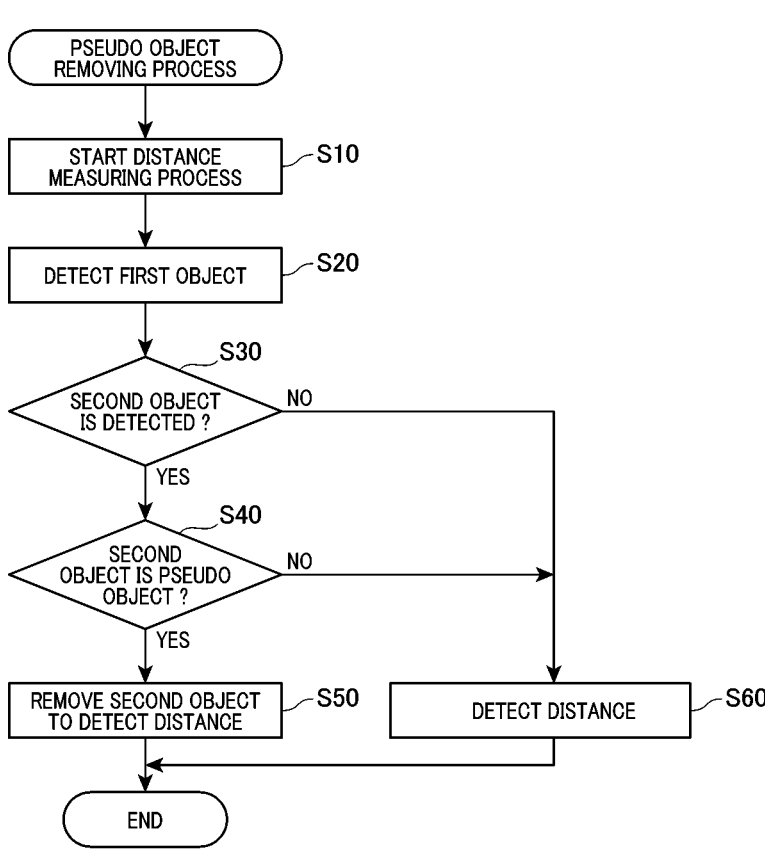
FIG. 3 is a flowchart of a pseudo object removing process.

With reference to FIG. 3, the pseudo object removing process performed by the optical distance measuring device 200 of the present embodiment will be described. The pseudo object removing process is started by, for example, turning on the power source of the optical distance measuring device 200. The pseudo object removing process is performed for each of the pixels 66 of each slot (direction) included in the scanning region RA. The flowchart in FIG. 3 illustrates an example of processing in one pixel 66 of one slot (direction) in the scanning region RA.

As illustrated in FIG. 3, the controller 100 controls drive of the light emitting unit 40, the scanning unit 50, and the light receiving unit 60 by the control unit 110 to start to detect a target in the scanning region RA and a distance to the target (hereinafter, referred to as a distance measuring process) (step S10). The addition unit 120 counts the number of signals output from the light receiving elements 68 of the pixels 66. The histogram generation unit 130 generates a histogram of signal intensity with respect to a time axis. The peak detection unit 140 analyzes the histogram to detect a peak signal of a first object, which is at a location in the scanning region RA, by receiving reflected light from the first object (step S20).

When detecting the first object, the peak detection unit 140 confirms whether there is a peak signal corresponding to a second object in the histogram, that is, whether the second object is detected (step S30). The second object means an object that is included in objects detected together with the first object and can be determined as a pseudo object corresponding to the first object. In the present embodiment, an object, which is located at a distance which is N times (N is a natural number of 2 or more) the distance to the first object on an extension of a straight line connecting the optical distance measuring device 200 and the first object, that is, in an emission direction of the laser light DL, is determined to be the second object. If the second object is not detected (S30: NO), the distance calculation unit 160 uses peak signals of the detected first object and other objects to determine the distance (step S60) and completes the present process. If the second object is detected (S30: YES), the pseudo object determination unit 150 determines whether the detected second object is a pseudo object (step S40).

In the present embodiment, when an object through which light is not transmitted, that is, an object having light non-permeability (hereinafter, also referred to as a third object) has been detected, and the second object has been detected at a location farther from the optical distance measuring device 200 than the third object, the pseudo object determination unit 150 determines that the second object is a pseudo object. The third object includes various objects having light non-permeability such as a road, the ground, a wall surface of a building. Whether the third object has been detected may be determined from a result of distance measurement by the optical distance measuring device 200, or, for example, a detection result of a detector other than the optical distance measuring device 200 such as a camera and a radar.

If it is determined that the second object is a pseudo object (S40: YES), the distance calculation unit 160 excludes the peak signal corresponding to the second object from the calculation of a distance, and uses peak signals of the detected first object and other objects to determine a distance (step S50) and completes the present process. Instead of the processing of excluding the peak signal corresponding to the second object from the calculation of a distance, processing of deleting the peak signal corresponding to the second object from a histogram may be performed. If it is not determined that the second object is a pseudo object (S40:

NO), the distance calculation unit 160 uses peak signals of the detected first and second objects and other objects to determine a distance (step S60) and completes the present process.

Figure 4:
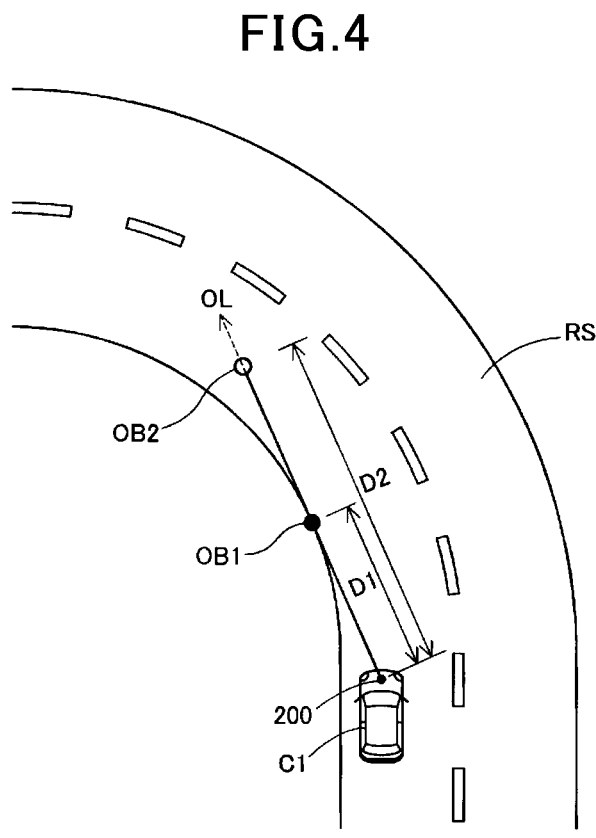
FIG. 4 is an explanatory diagram in plan view illustrating a state in which a second object is detected.
Figures 5, 6:
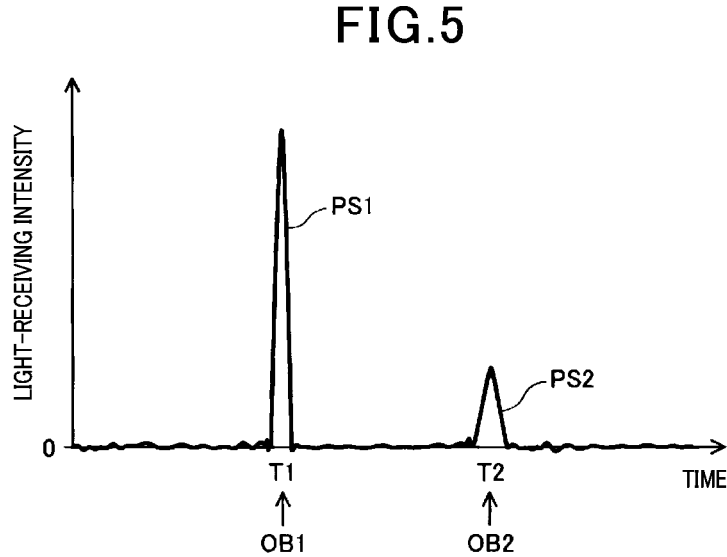
FIG. 5 is an explanatory diagram illustrating peak signals of a first object and the second object.
FIG. 6 is an explanatory diagram in side view illustrating a state in which the second object is detected.

With reference to FIG. 4 to FIG. 6, a specific example of the pseudo object removing process performed by the optical distance measuring device 200 of the present embodiment will be described. In FIG. 4, a state is illustrated in which a vehicle C1 in which the optical distance measuring device 200 of the present embodiment is installed is traveling on a road RS. FIG. 4 schematically illustrates a first object OB1 and a second object OB2, which is a pseudo object corresponding to the first object OB1. The first object OB1 is a so-called strongly reflective material utilizing so-called retroreflection, which is reflection of incident light toward the light source thereof. The first object OB1 is also referred to as, for example, a retroreflector, a corner cube, a retroreflector or a retroreflective material. Intensity of the reflected light from the first object OB1 may be higher than usual. As illustrated in FIG. 4, the first object OB1 is located at a distance D1 from the optical distance measuring device 200 in the direction OL. The second object OB2 is located at a distance D2 from the optical distance measuring device 200 in the direction OL. The distance D2 is twice the distance D1. The optical distance measuring device 200 has completed the detection of the road RS as the third object while the vehicle C1 is traveling.

As illustrated in FIG. 4, the laser light emitted in the direction OL for distance measurement is reflected by the first object OB1, which is an object present in the direction OL. As illustrated as a histogram of signal intensity in FIG. 5, part of the reflected light from the first object OB1 is received by the light receiving elements 68 of the light receiving unit 60 and is detected as a peak signal PS1 corresponding to the first object OB1. The distance calculation unit 160 utilizes TOF and uses time T1 at which the peak signal PS1 is detected to calculate the distance D1 to the first object OB1.

Since the first object OB1 is a strongly reflective material, the intensity of the reflected light from the first object OB1 is high. Hence, part of the reflected light from the first object OB1 is reflected by the surface of the light receiving unit 60 and travels as the second reflected light in the direction OL. The second reflected light is reflected by the first object OB1 and is received by the light receiving elements 68. As illustrated in FIG. 5, since the second reflected light received by the light receiving elements 68 travels back and forth between the first object OB1 and the light receiving elements 68 two times, the second reflected light is detected as a peak signal PS2 corresponding to the second object OB2 at a location at the distance D2, which is twice the distance D1, in the direction OL.

FIG. 6 schematically illustrates a state, in which distances to the first object OB1 and the second object OB2 are detected by the optical distance measuring device 200, viewed from the side surface side of the vehicle C1. As illustrated in FIG. 6, the optical distance measuring device 200 detects, in addition to the first object OB1 and the second object OB2, the road RS. The pseudo object determination unit 150 uses a result of detection of the road RS and a result of detection of the distance to the second object OB2 to determine whether the second object OB2 is at a location farther from the optical distance measuring device 200 than the road RS. As illustrated in FIG. 6, the second object OB2 has been detected at a location farther from the optical distance measuring device 200 than the road RS, which is the third object, on a straight line OL. Hence, the pseudo object determination unit 150 determines that the second object OB2 is a pseudo object. The distance calculation unit 160 excludes the peak signal corresponding to the second object OB2 from the calculation of a distance, and uses the peak signal of the first object OB1 to determine a distance. As described above, according to the optical distance measuring device 200 of the present embodiment, when the first object OB1 and the second object OB2 are detected, and the second object OB2 is determined to be a pseudo object corresponding to the first object OB1, the result of detection of the second object OB2 is removed. Hence, influence of the pseudo object is reduced, whereby a target can be accurately detected. Detecting the second object OB2 as an actually present target can be avoided, and the control for avoiding a collision with the pseudo object by the vehicle in which the optical distance measuring device 200 is installed can be suppressed or prevented from being performed.

According to the optical distance measuring device 200 of the present embodiment, when the road RS as the third object having light non-permeability has been detected, and the second object OB2 has been detected at a location farther from the optical distance measuring device 200 than the road RS is, the pseudo object determination unit 150 determines the second object OB2 to be a pseudo object. Using a state, in which no target is detected physically, as a condition for determining a pseudo object can accurately determine whether the second object OB2 is the pseudo object.

B. Second Embodiment

The optical distance measuring device 200 according to a second embodiment will be described with reference to FIG. 7. The optical distance measuring device 200 of the second embodiment differs from the optical distance measuring device 200 of the first embodiment in the method of determining a pseudo object in step S40 of the pseudo object removing process, and are similar to the optical distance measuring device 200 of the first embodiment in other configurations.

When the second object is detected while the optical distance measuring device 200 is moving, the optical distance measuring device 200 of the present embodiment uses a result of tracking a relative location of the second object with respect to the first object to determine whether the second object is a pseudo object. More specifically, the pseudo object determination unit 150 tracks a relative location of the second object with respect to the first object during a predetermined time period from the time at which the second object is detected. The predetermined time period is a time period during which the optical distance measuring device 200 moves and may be set to any time period. If the relative location of the second object with respect to the first object is kept to a location distanced by N times the distance from the optical distance measuring device 200 to the first object, the pseudo object determination unit 150 determines that the second object is a pseudo object.

Figure 7:
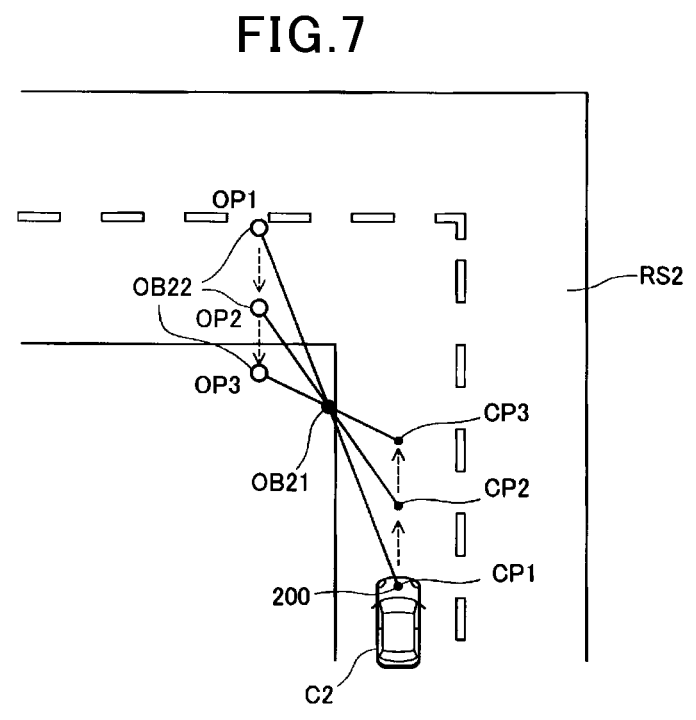

As illustrated in FIG. 7, the optical distance measuring device 200 is installed in a vehicle C2. According to the travel of the vehicle C2, the optical distance measuring device 200 moves through a location CP1, a location CP2, and a location CP3 on a road RS2 in this order during the predetermined time period. At the location CP1, the optical distance measuring device 200 detects a first object OB21, which is a strongly reflective material, and detects a second object OB22 at a location OP1. At the location CP2, the optical distance measuring device 200 detects the first object OB21 and detects the second object OB22 at a location OP2. At the location CP3, the optical distance measuring device 200 detects the first object OB21 and detects the second object OB22 at a location OP3. During the predetermined time period from the time when the second object OB22 is detected at the location CP1 to the time when the vehicle C2 reaches the location CP3, the relative location of the second object OB22 with respect to the first object OB21 is kept to a location distanced by two times the distance from the optical distance measuring device 200 to the first object OB21. Hence, the pseudo object determination unit 150 determines that the second object OB22 is a pseudo object.

According to the optical distance measuring device 200 of the present embodiment, the distance measuring process is performed while the optical distance measuring device 200 is moving to track the second object OB22 during a predetermined time period from the time at which the second object OB22 is detected. When the relative location of the second object OB22 with respect to the first object OB21 is kept to be distanced by N times the distance from the optical distance measuring device 200 to the first object OB21, the pseudo object determination unit 150 determines that the second object OB22 is a pseudo object. Whether the second object OB22 is a pseudo object can be determined by utilizing behavior of the second object OB22 while the optical distance measuring device 200 is moving. Hence whether the second object OB22 is a pseudo object can be determined while the optical distance measuring device 200 is moving.

C. Third Embodiment

The optical distance measuring device 200 according to a third embodiment will be described with reference to FIG. 8. The optical distance measuring device 200 of the second embodiment differs from the optical distance measuring device 200 of the first embodiment in the method of determining a pseudo object in step S40 of the pseudo object removing process, and are similar to the optical distance measuring device 200 of the first embodiment in other configurations.

The optical distance measuring device 200 according to the present embodiment utilizes the so-called Law of attenuation of light in which intensity of light is inversely proportional to the square of the distance from the light source. When signal intensity of the second object satisfies the so-called inverse square law with respect to the first object, it is determined that the second object is a pseudo object. More specifically, when signal intensity of the second object located at a distance N times the distance from the optical distance measuring device 200 to the first object OB1 is inversely proportional to the square of N with respect to signal intensity of the first object (inversely proportional to the square of N times the signal intensity of the first object), it is determined that the second object is a pseudo object.

Figure 8:
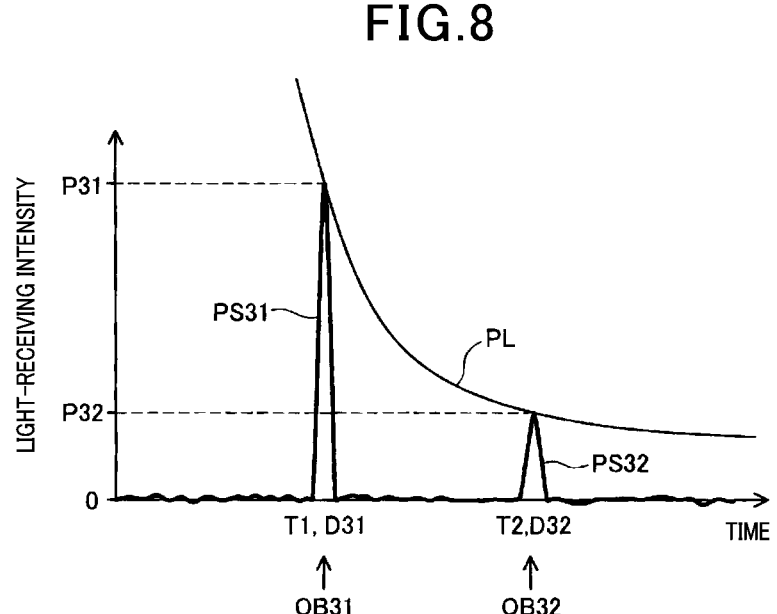
FIG. 8 is an explanatory diagram illustrating a condition for determining that the second object is a pseudo object by an optical distance measuring device according to a third embodiment.

As illustrated in FIG. 8, a first object OB31, which is a strongly reflective material, located at a distance D31 from the optical distance measuring device 200 is detected as a peak signal PS31. The second object OB22 located at a distance D32 corresponding to the distance two times the distance D31 from the optical distance measuring device 200 is detected as a peak signal PS32. A curve PL illustrated in FIG. 8 is a graph inversely proportional to the square of a ratio with respect to the distance D31 to the first object OB31 with reference to the distance D31. When signal intensity of the second object OB22 is located on the curve PL, the pseudo object determination unit 150 determines that the second object OB32 is a pseudo object. Not only when the signal intensity of the second object OB22 is located on the curve PL, but also, considering an detection error and the like, when the signal intensity of the second object OB22 is located in a predetermined range including the curve PL, it may be determined that the second object OB32 is a pseudo object. The distance D32 illustrated in FIG. 8 is twice (N=2) the distance D31, and signal intensity P32 of the peak signal PS32 is $1/N^2$ (the square of N) and is approximately one-fourth of signal intensity P31 of the peak signal PS31. The pseudo object determination unit 150 determines that the signal intensity of the second object OB22 is inversely proportional to the square of N with respect to the signal intensity of the first object OB31 (inversely proportional to the square of N times the signal intensity of the first object OB31), thereby determining that the second object OB32 is a pseudo object.

According to the optical distance measuring device 200 of the present embodiment, when the signal intensity P32 of the second object OB22 is inversely proportional to the square of N with respect to the signal intensity 31 of the first object OB31 (inversely proportional to the square of N times the signal intensity 31 of the first object OB31), the pseudo object determination unit 150 determines that the second object OB32 is a pseudo object. Whether the second object OB32 is a pseudo object can be determined from a histogram of signal intensity, whereby the pseudo object can be determined by a simple method.

D. Fourth Embodiment

The optical distance measuring device 200 according to a fourth embodiment will be described with reference to FIG. 9. The optical distance measuring device 200 according to the fourth embodiment differs from the optical distance measuring device 200 of the first embodiment in the method of determining a pseudo object in step S40 of the pseudo object removing process, and are similar to the optical distance measuring device 200 according to the first embodiment in other configurations.

The optical distance measuring device 200 of the present embodiment performs, after the first and the second objects are detected, a distance measuring process under a first distance measurement condition that output of the light emitting unit 40 is reduced so as to be lower than output at the time when the first object and the second object are detected. The optical distance measuring device 200 may perform a distance measuring process under, in addition to the first distance measurement condition or instead of the first distance measurement condition, a second distance measurement condition that the number of times the histogram generation unit 130 acquires a detection signal from the light receiving unit 60 is reduced so as to be smaller than the number of times at the time when the first object and the second object are detected.

Figures 9, 10:
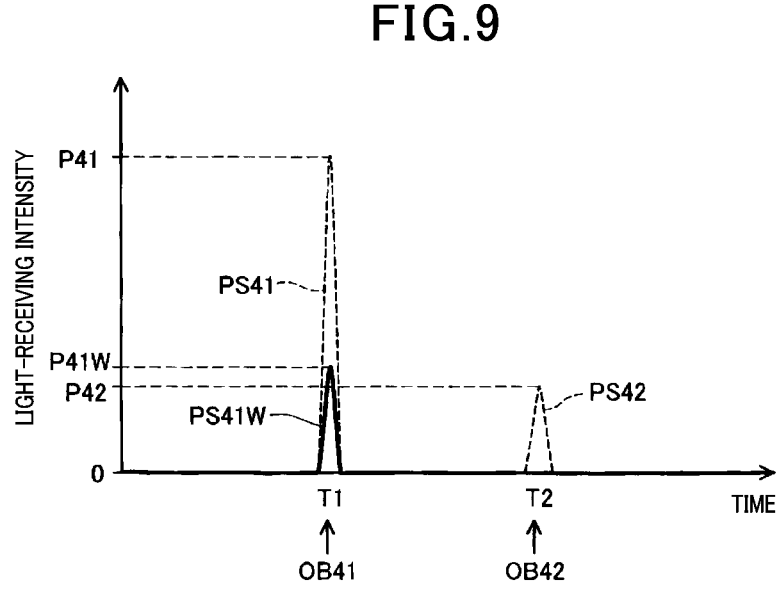
FIG. 9 is an explanatory diagram illustrating a condition for determining that the second object is a pseudo object by an optical distance measuring device according to a fourth embodiment.
FIG. 10 is an explanatory diagram illustrating a condition for determining a peak signal corresponding to a clutter item by an optical distance measuring device according to a fifth embodiment.

As illustrated in FIG. 9, a peak signal PS41 corresponding to a first object OB41, which is a strongly reflective material, detected by the peak detection unit 140 and a peak signal PS 42 corresponding to a second object OB42 located at a distance twice the distance to the first object OB41 are indicated by broken lines. In the present embodiment, if the second object OB42 is detected together with the first object OB41, the control unit 110 controls the light emitting unit 40 to detect a distance in a state where output of laser light is reduced so as to be lower than output at the time when the first object OB41 and the second object OB42 are detected. The distance measuring process under at least one of the first distance measurement condition and the second distance measurement condition is also referred to as a strongly reflective material detection process. Output of the laser light reduced in the strongly reflective material detection process is set so as to be able to detect a peak signal PS41W of the first object OB41 as a strongly reflective material. Since the output of the laser light is reduced, as illustrated in FIG. 9, signal intensity P41 of the peak signal PS41 corresponding to the first object OB41 is reduced, whereby the peak signal PS41W having signal intensity P41W can be acquired. The peak signal PS 42 having signal intensity P42 corresponding to the second object OB42 disappears, whereby no peak signal is detected. Thus, since the strongly reflective material detection process is performed after the first object OB41 and the second object OB42 are detected, it is determined whether the first object OB41 is detected to determine whether the first object OB41 is a strongly reflective material. If it is determined that the first object OB41 is a strongly reflective material, the pseudo object determination unit 150 determines that the second object OB2 is a pseudo object.

According to the optical distance measuring device 200 of the present embodiment, when the first object OB41 and the second object OB42 are detected, the strongly reflective material detection process is performed in which output of laser light is reduced so as to be lower than output at the time when the first object OB41 and the second object OB42 are detected. When the first object OB41 is detected, it is determined that the first object OB41 is a strongly reflective material and that the second object OB42 is a pseudo object. Hence, the pseudo object can be detected by a simple method.

E. Fifth Embodiment

The optical distance measuring device 200 according to a fifth embodiment will be described with reference to FIG. 10. The optical distance measuring device 200 of the fifth embodiment differs from the optical distance measuring device 200 of the first embodiment in that a clutter removing process for removing a result of detection of clutter is performed in addition to the pseudo object removing process of the first embodiment, and are similar to the optical distance measuring device 200 of the first embodiment in other configurations. The clutter means reflected light that is light emitted from the light emitting unit 40 and reflected by the window 82 of the housing 80. Since a clutter item can be detected as a peak signal when entering the light receiving unit 60, accuracy in distance measurement of the optical distance measuring device 200 may be lowered. Typically, the clutter item is detected as a peak signal that is at a short distance from the optical distance measuring device 200 and has intensity lower than that of the reflected light from the object OB.

FIG. 10 illustrates a peak signal PS5 corresponding to a clutter item. The peak signal PS5 is detected together with the peak signal PS1 of the first object OB1 and the like through histogram analysis by the peak detection unit 140. In the present embodiment, if the detected distance of the detected peak signal is shorter than a predetermined time threshold Tt, and the received light intensity is lower than a predetermined intensity threshold Pt, the pseudo object determination unit 150 determines that the detected peak signal is a peak signal corresponding to a clutter item. The distance calculation unit 160 removes a result of detection of the peak signal PS5 corresponding to the clutter item to detect a distance.

FIG. 10 illustrates a possible maximum value Pmax of the received light intensity. The maximum value Pmax is the total number of the light receiving elements 68 per one pixel used for generating a histogram. As described with reference to FIG. 2, one pixel 66 is formed of 5*5 light receiving elements 68. If N is an integer number of 2 or more, when results of light reception due to N times of light emission are summed to generate a histogram, the possible maximum value Pmax of the received light intensity is equal to N*5*5. The intensity threshold Pt is typically set to a value lower the possible maximum value Pmax of the received light intensity. In the present embodiment, the intensity threshold Pt is set to received light intensity that is 50% of the maximum value Pmax. The intensity threshold Pt may be set to a value equal to the maximum value Pmax. The time threshold Tt is set to be at an arbitrary distance close to a distance from the optical distance measuring device 200. The time threshold Tt may be set to specific travel time corresponding to a distance of a light path from the light emitting unit 40 to the window 82 or, considering an error and the like, a distance longer than the distance of the light path from the light emitting unit 40 to the window 82. In the present embodiment, the time threshold Tt is set to a distance of one meter from the light emitting unit 40 which is longer than the distance of the light path from the light emitting unit 40 to the window 82.

According to the optical distance measuring device 200 of the present embodiment, when the distance measuring process is performed, in addition to a result of detection of a pseudo object, a peak signal due to a clutter item is removed. Hence, accuracy in distance measurement of the optical distance measuring device 200 due to the clutter is prevented from lowering, whereby a target can be detected more accurately.

Other Embodiments

The control unit and the methods executed by the control unit in the present disclosure may be implemented by a dedicated computer including a processor and a memory programmed to execute one or more functions embodied by computer programs. The control unit and the methods executed by the control unit in the present disclosure may be implemented by a dedicated computer including a processor formed of one or more dedicated hardware logical circuits. The control unit and the methods executed by the control unit in the present disclosure may be implemented by one or more dedicated computers including a combination of a processor and a memory programmed to execute one or more functions and a processor including one or more hardware logical circuits. The computer programs may be stored, as instructions to be executed by a computer, in a computer-readable non-transitory tangible recording medium.

The present disclosure is not limited to the above embodiments and can be implemented by various configurations within a range not deviating from the spirit thereof. For example, technical features in the embodiments corresponding to the technical features in the aspect described in SUMMARY can be appropriately replaced or combined with each other in order to solve all or part of the objects described above or to achieve all or part of the effects described above. Some of the technical features can be appropriately deleted if they are not described as essentials herein.

As an aspect of the present disclosure, an optical distance measuring device is provided which includes: a light emitting unit (40) that emits emitted light (DL); a window (82) through which the emitted light is transmitted; a light receiving unit (60) that has a light receiving pixel (66) for receiving incident light and outputs a detection signal corresponding to received light intensity of the incident light received by the light receiving pixel; and a controller (100) that acquires a detection signal corresponding to received light intensity of reflected light (RL), which corresponds to the emitted light reflected by an object (OB), from the light receiving unit that has received the reflected light as the incident light, to detect a distance to the object by using the detection signal corresponding to the received light intensity of reflected light. When a first object (OB1, OB21, OB31, OB41) and a second object (OB2, OB22, OB32, OB42) located at a distance (D2) which is N times (N is a natural number of 2 or more) a distance (D1) to the first object on an extension of a straight line (OL) connecting the optical distance measuring device and the first object are detected, and the second object is determined to be a pseudo object corresponding to the first object, the controller removes a result of the detection of the second object. If it is determined that the acquired detection signal is a detection signal corresponding to reflected light reflected by the window, the controller removes a result of detection corresponding to the window.

According to the optical distance measuring device of the present embodiment, when the first object and the second object are detected, and the second object is determined to be a pseudo object corresponding to the first object, the result of the detection of the second object is removed. Hence, influence of the pseudo object on the detection of a distance is reduced, whereby a target can be accurately detected. Detecting the second object as an actually present target can be avoided, and the control for avoiding a collision with the pseudo object by the vehicle in which the optical distance measuring device is installed can be suppressed or prevented from being performed.

What is claimed is:

1. An optical distance measuring device, comprising:
a light emitting unit that emits emitted light;
a window through which the emitted light is transmitted;
a light receiving unit that has a light receiving pixel for receiving incident light and outputs a detection signal corresponding to received light intensity of the incident light received by the light receiving pixel; and
a controller that acquires a detection signal corresponding to received light intensity of reflected light, which corresponds to the emitted light reflected by an object, from the light receiving unit that has received the reflected light as the incident light, to detect a distance to the object by using the detection signal corresponding to the received light intensity of reflected light, wherein
when a first object and a second object located at a distance which is N times (N is a natural number of 2 or more) a distance to the first object on an extension of a straight line connecting the optical distance measuring device and the first object are detected, and the second object is determined to be a pseudo object corresponding to the first object, the controller removes a result of the detection of the second object, and
when it is determined that the acquired detection signal is a detection signal corresponding to reflected light reflected by the window, the controller removes a result of detection corresponding to the window, after the first object and the second object are detected, the controller performs a strongly reflective material detection process that is a distance measuring process including at least one of:

a first distance measurement condition in which output of the emitting light is reduced so as to be lower than output at time when the first and the second object are detected; and a second distance measurement condition in which the number of times the detection signal is acquired from the light receiving unit is reduced so as to be smaller than the number of times at time when the first and the second object are detected, and when the first object is detected in the strongly reflective material detection process, the controller determines that the second object is the pseudo object.

2. The optical distance measuring device according to claim 1, wherein when a third object having light non-permeability is detected, and the second object has been detected at a location farther from the optical distance measuring device than the third object, the controller determines that the second object is the pseudo object.

3. The optical distance measuring device according to claim 1, wherein the controller detects a distance to the object during a predetermined time period while the optical distance measuring device is moving, and determines that the second object is the pseudo object when a relative location of the second object with respect to the first object is kept to be distanced by the distance which is N times the distance to the first object.

4. The optical distance measuring device according to claim 1, wherein when signal intensity of the second object is inversely proportional to the square of N times signal intensity of the first object, the controller determines that the second object is the pseudo object.

* * * * *